United States Patent [19]
Holmes et al.

[11] 3,941,939
[45] Mar. 2, 1976

[54] ELECTRONIC RING TRIP CIRCUIT

[75] Inventors: Phillip L. Holmes; Frank Cinkus; John Hugh Green, all of Milan, Tenn.

[73] Assignee: International Telephone and Telegraph Corporation, New York, N.Y.

[22] Filed: Nov. 25, 1974

[21] Appl. No.: 526,633

[52] U.S. Cl. .................. 179/18 HB; 179/84 R
[51] Int. Cl.² ............................... H04M 3/02
[58] Field of Search ........... 179/18 FA, 18 F, 84 A, 179/84 R, 18 HB

[56] References Cited
UNITED STATES PATENTS

| | | | |
|---|---|---|---|
| 3,730,999 | 5/1973 | Shaffer | 179/84 R |
| 3,746,798 | 7/1973 | Thomas | 179/18 HB |
| 3,748,401 | 7/1973 | Pesz et al. | 179/84 R |
| 3,865,992 | 2/1975 | Bouty et al. | 179/84 A |

*Primary Examiner*—Thomas A. Robinson
*Attorney, Agent, or Firm*—James B. Raden; Marvin M. Chaban

[57] ABSTRACT

Disclosed is an electronic ring trip circuit which does not require the use of an electromagnetic ring trip relay. The circuit employs an optical coupler as the off-hook detector to act on an essentially bi-stable operational amplifier which is normally in a ring enabling state. With the amplifier in this state, the circuit responds to ring current and a ring connect relay is enabled by the circuit for operation. When the called station goes off-hook, the amplifier is switched to its ring trip state and disables the ring connect relay. An input circuit for the ring current shunts this AC away from the optical coupler to render the coupler responsive to minor changes in DC resulting from the called station going off-hook.

7 Claims, 2 Drawing Figures

ELECTRONIC RING TRIP CIRCUIT

BACKGROUND OF THE INVENTION

Ring trip circuits are of course well known in the telephone art and these circuits respond to an off-hook condition at a called line to terminate the ringing. Most generally these circuits use relays to provide the isolation of the off-hook detector from line conditions while providing sensitivity enough to respond to the DC path closure caused by a station on the line going off-hook. More recently with the advent of optical couplers, a number of approaches have been developed using these components to provide DC detection with the necessary line to CO isolation.

In such systems, one major problem is to maintain the isolation provided by an optical coupler while maintaining the DC sensitivity of the off-hook detector at sensitive levels. The circuit must sense the off-hook DC current under the line condition extremes which may be encountered in a system. The circuit receives AC ringing signals which it must ignore while acting to detect a change in line conditions due to a called station going off-hook to shut off the ringing signals.

In the prior art use of optical couplers, variable resistors are commonly used with multiple strapping points to allow the circuit to be set individually for each line condition under which the circuit is to operate.

SUMMARY OF THE INVENTION

The present invention provides an electronic ring trip circuit for telephone systems. The circuit as shown responds to a wide range of line conditions by providing a filter for ringing current from 16 cps to 66 cps. The filter shunts most of the AC from the ringing current away from the detector circuit to render the detector more sensitive to changes in the applied DC level.

The detector responds to a constant current DC which occurs on the called station going off-hook to trigger its LED within an optical coupler. The combination of DC plus the unfiltered portion of the ring current causes the LED to pulse on the on-hook condition. The output transistor of the optical coupler conducts during the pulse periods to cause a capacitor to partially discharge. The partial discharges due to the alternate half cycles is insufficient to discharge the capacitor to the output threshold of an operational amplifier. When the called station goes off-hook, the resultant DC operates the coupler more steadily to more fully discharge the capacitor and cause the operational amplifier to switch its condition and to latch in the switched condition. The change of condition causes the ring connect relay to release shutting off ringing current to the line. The amplifier latches itself in the switched state to keep the ringing cut off.

It is therefore an object of the invention to provide an improved electronic ring trip circuit.

It is a further object of the invention to provide an improved ring trip circuit using optical couplers, in which the AC ring input to the trip circuit is shunted away from the off-hook detector.

It is a still further object of the invention to provide an electronic ring trip circuit with an operational amplifier which responds to an off-hook condition and latches itself in a ring cut-off condition.

DETAILED DESCRIPTION OF THE DRAWINGS

Figure 1:
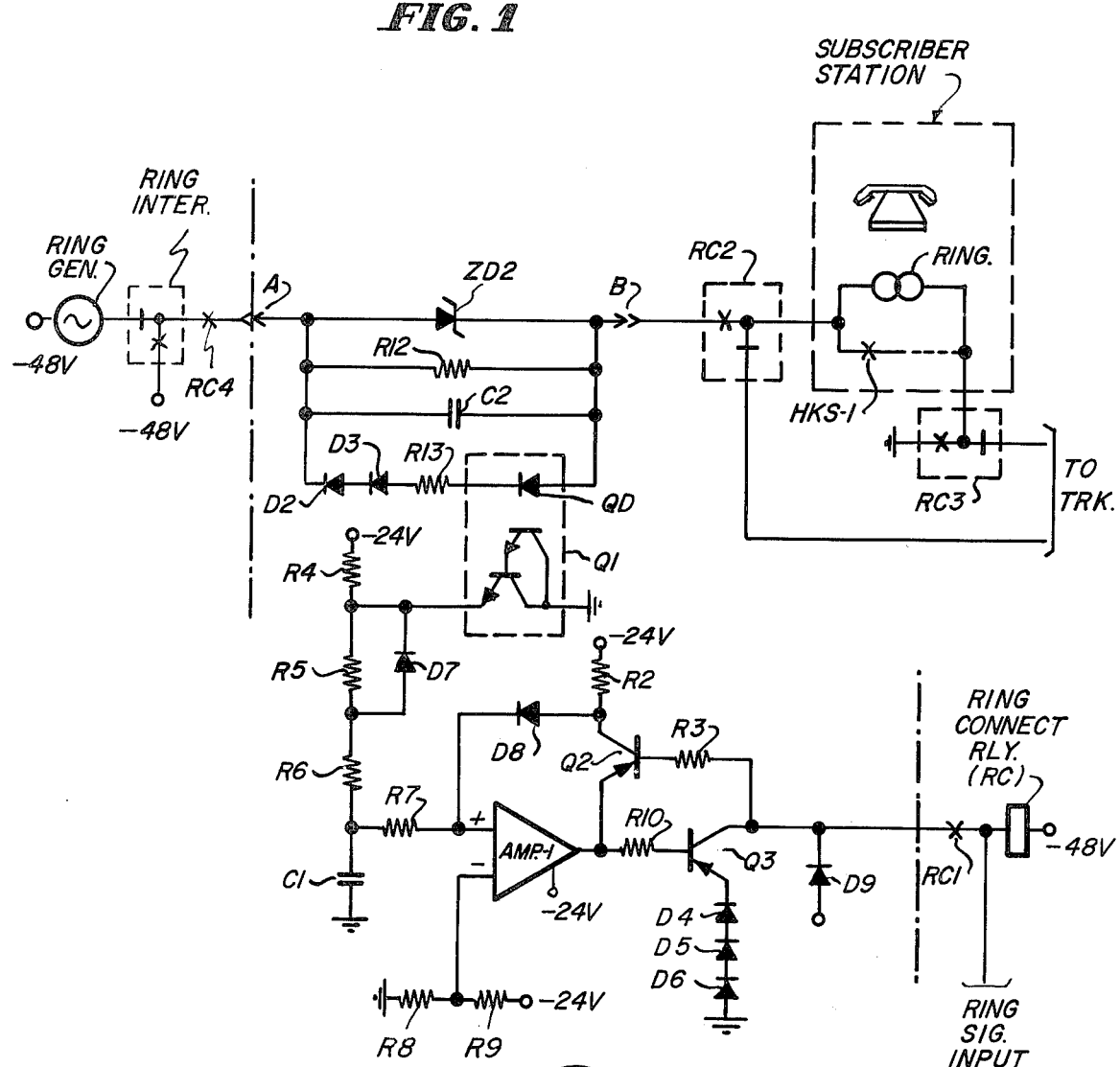
FIG. 1 is a schematic circuit diagram of a preferred embodiment of our invention.

The circuit of FIG. 1 is shown as wired for battery connected ringing generator and will be described for this direction of bias. For ground connected generator, terminal A would be connected to the telephone station line and terminal B to the ringing generator. With either arrangement, the generator may be any known type.

In the drawing, we show a ring trip circuit which is connected between or in the final stage of a switching network and a called telephone station. Associated with the ring trip circuit is a conventional ring connect relay RC of any known design and a ringing interrupter of any conventional suitable design.

The ring connect relay RC receives input ring signals and responds to the first of these signals to connect a ringing generator to the subscriber station ringer through the ring trip circuit. On operation, relay RC switches its contacts RC1–RC4. Ring input to relay RC is terminated after a period deemed sufficient to enable relay RC to operate fully.

Contacts RC1 act to latch the RC relay operated over a path from −48 volts to ground through normally conducting transistor Q3 and series string of diodes D4, D5 and D6. The relay RC latches over this path to maintain its contacts closed to operate the ringing generator and to feed the interrupted AC ring current to the called station over lead AB.

Contacts RC2, RC3 and RC4 close on operation of the relay to connect the ringing current from the ringing generator to the ringer of the called station and ground. The ringing generator is operated over this path between ground and −48 volts. The generator operates self-interruptedly in a conventional manner over an obvious path to produce sinusoidal AC ringing current which is symmetrical directionally.

The ringing current is filtered by the combination of resistor R12 and capacitor C2 which act to filter a major part of the AC ringing current and shunt this current around from the LED of optical coupler Q1.

Relay RC locks through its own make contact to a ground supplied by transistor Q3 which is biased to its conductive state by operational amplifier AMP1 to provide locking current through transistor Q3. In this mode, the AMP1 supplies the "logic O" output (toward −24 volts). The operational amplifier itself is used as a differential comparator, giving rise to essentially digital operation on its output, turning the transistor either "on" or "off".

Ringing voltage is supplied from the generator to the telephone. The generator may be either ground-connected (not shown) or battery-connected (as shown). As mentioned previously, the following explanation will cover the battery-connected case. The generator, therefore, will be biased to a DC value of negative 48 volts (central office battery). The generator produces a sinusoidal AC voltage of up to 90 volts typically in the frequency range between 16 Hz to 66 Hz. During the on-hook, ringing condition of the telephone system, essentially no DC current reaches the ring trip input lead AB. The current reaching lead AB is essentially sinusoidal and symmetrical with respect to direction, having no DC component. During one-half cycle, Zener diode ZD2 will shunt current in the A–B direction. During these and the alternate half cycles, the filter comprised of resistor R12 and capacitor C2 act as a low resistance shunt for AC.

When the interrupter switches from generator voltage to negative battery, the voltage impressed on the telephone includes only the DC component present during ringing, but current flow is zero, being blocked by the ringer circuit in the telephone. The ring-trip network in the tip-ring circuit AB functions to steer appropriate current into the light emitting diode QD of transistor Q1. As current begins to flow from ground through the telephone to the generator or negative battery, a voltage is developed across diodes D2 and D3 producing a regulated voltage across the LED QD of Q1, while Zener diode ZD2 is back biased. As current through resistor R13 tends to produce a voltage in series combination with the voltage of the LED of Q1, the LED of Q1 is protected from high DC currents and made uniform in operation over the range of other parameters.

When the current reverses direction of flow — going from the generator through the telephone to ground — Zener diode ZD2 conducts bypassing the Q1 LED altogether. Diodes D2 and D3 protect the LED from the reverse voltage.

Thus, the current flows in a cyclic fashion in the tip-ring circuit and a portion flows through the LED of Q1 on each half-cycle. Transistor Q1 turns on as the LED conducts, bringing its emitter node toward ground while beginning a discharge of capacitor C1. The capacitor normally retains a charge of −24 volts during the quiescent state, through the path of resistor R6, diode D7, and resistor R4. When the discharge of C1 is brought about by Q1, a discharge path may be followed through resistors R6, R5 and transistor Q1. The charge and discharge path resistance is approximately equal at a nominal value of 260K. Diode D7 allows this by by-passing R5 in the charge path, and resistor R6 is a common element. The lead from capacitor C1 into the non-inverting input of amplifier AMP1 is a high impedance input which does not appreciably affect the charge and discharge of C1. A reference voltage of half negative twenty-four volts is provided to the inverting input of AMP1 by the voltage divider resulting from resistors R8 and R9.

The combination of resistor R12 and capacitor C2 act as a bandpass filter to shunt the ringing frequency in parallel around LED of the optical coupler to reduce the AC component of the voltage in the detection network to a minimum. Capacitor C2 is a polar capacitor of 470 microforads to shunt the ring frequency regardless of the frequency used, within the normal 16 to 66 cps range.

Figure 2:
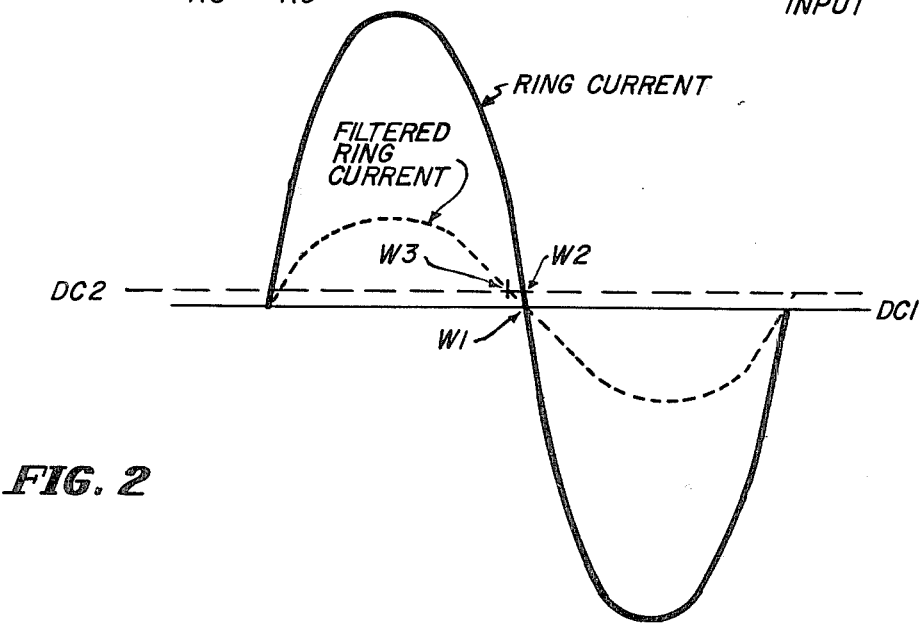
FIG. 2 is a waveform chart showing the ringing waveform applied to the circuit of FIG. 1.

With the quiescent voltage of negative twenty-four on the plus terminal and negative twelve on the negative terminal of amplifier AMP1, the polarity on the terminals (+ and −) are reversed, causing the AMP1 to be in the logic 0 mode or toward −24 volts. As the charge and discharge of C1 takes place alternately due to ringing current in the tip-ring loop, the charge on C1 is decreased and replenished such that the −12 volts threshold is not reached on the plus terminal of AMP1 at the frequencies in question because of the symmetry of the cyclic current wave with respect to time. During an off-hook condition, however, a DC current component flows in the tip-ring circuit. Now, with a strong DC component super-imposed on a sinusoidal current, the amount of current flow and its period in the direction of the DC is considerably longer than during the other AC half-cycle, resulting in the Q1 transistor being on longer than it is off due to the ringing frequency. This effect is shown in the chart of FIG. 2.

When the called party goes off-hook, and closes contacts HKS-1, ground is fed to the path including the LED, R13, D3 and D2 to cause the LED to emit its optical output constantly, sensed by transistor Q1 and this causes the transistor to conduct and complete the discharge path for capacitor C1.

Consequently, the capacitor C1 will alternately be discharged longer than it is charged producing over several cycles a net decrease in charge. After a number of cycles, the threshold of the plus terminal of AMP1 is reached. This interval of the station being off-hook prior to response may be as long as 200 milliseconds without causing any problems. When the polarity on AMP1 is such that the plus terminal is positive with respect to the negative terminal, the output of AMP1 switches to the logic 1 mode, or to ground, turning off the transistor Q3. Furthermore, as soon as the logic 1 output is reached on the AMP1 output, the output is coupled back to the plus terminal input through transistor Q2 (this transistor having been enabled for conduction by the change of condition of AMP1 and the shutting off of transistor Q3. The feedback path through resistor R3 latches AMP1 in the logic 1 state. The snap action resulting from this latching of the amplifier prevents oscillations of the amplifier AMP1 and transistor Q3 between logic 0 and logic 1 for small excursions across the switching threshold of the AMP1 since the RC relay locked to Q3 would not be able to respond to the fast discontinuities in current; moreover, the decision to trip will have been made at the instant the threshold on AMP1 has first been reached. When Q3 turns off, relay RC drops out. During the silent period, with ring current shut off, DC current flows in the tip-ring circuit (in the direction to cause tripping) and Q1 turns on fully, completely discharging C1 with no oscillations once an off-hook is established in the tip-ring circuit.

When relay RC releases and opens its hold path contacts RC1, transistor Q2 shuts off due to the removal of its base current consequent to contact RC having opened. With ring current shut off, capacitor C1 recharges and when the threshold level of amplifier AMP-1 is reached, the amplifier restores to its normal condition.

In FIG. 2, there is shown the input sinusoidal curve of ringing current. The ringing current of 90 volts r.m.s. represented by the sine wave is generally symmetrical about its horizontal axis DC1. This condition exists with ringing current fed to the called station prior to response by the called station. When the called station goes off-hook, a DC path is closed and this DC is super-imposed on the ringing current.

The difference between the no DC component DC-1 and the closed DC path shown by DC-2 provides the difference which must be sensed. The window between points W2 on the line DC2 and W1 on DC1 must be sensed. As can be seen, the duration of this window is extremely short, making sensing of the DC a task of extreme sensibility and difficulty. By reducing the AC reaching the sensing LED to the level of the curve indicated by the Filtered Ring Current Curve, the period of the sensing window is increased to a period from W3 to W1, a considerably greater period than W to W1, thereby greatly eliminating the need for the greater sensitivity. It has been found that the DC difference between line DC1 and that of the line DC2 may be as low as 2 volts DC under some of the operating conditions under which the present ring trip circuit is designed to operate.

We claim:

1. A ring control circuit for a telephone line to which alternating current ringing signals are applied from a ring signal source, including a ring connect relay operated responsive to ring signal input to close a path from said source to said telephone line and to a ring trip portion of said circuit, means for latching said relay in its operated condition, direct current detecting means responsive to rectified alternating current ring signals for maintaining the charge on a capacitor beyond a threshold level, means responsive to direct current through said line resulting from a closed loop condition of said line for causing the direct current and superimposed rectified ringing current to cause the charge on said capacitor to pass said level, an operational amplifier responsive to the charge of said capacitor passing said threshold for changing condition to release said latching means to cause release of said relay, said relay on release opening the closed path, and means for latching said amplifier in said changed condition.

2. A ring control circuit as claimed in claim 1 wherein said latch means comprises a feedback path to one input of said amplifier with the path from the capacitor on discharge being connected to the other input to said amplifier.

3. A ring control circuit as claimed in claim 2, wherein said feedback path includes a first, normally non-conductive transistor, and said amplifier has an output path including a second transistor which is normally conductive and is responsive to said amplifier changing condition for being shut off, said second transistor on being shut off causing said first transistor to turn on and become conductive to complete the feedback path.

4. A ring control circuit as claimed in claim 3, wherein said ring connect relay is coupled to said second transistor, said second transistor on conduction enabling said relay for operation and maintaining a hold path for said relay over said second transistor.

5. A ring control circuit as claimed in claim 2, wherein there is means for shunting ringing current from said direct current detector, and said shunting means comprises a band pass filter in parallel with said current detector with the pass band of said filter covering the ringing signal range of 16 to 66 Hz.

6. A ring control circuit as claimed in claim 1 wherein said current detecting means comprises an optical coupler, and in which there are means for filtering the ringing current to reduce the amplitude levels thereof to said coupler.

7. A ring control circuit for a telephone line to which alternating current ringing signals are applied from a ring signal source, including a ring connect relay operated responsive to ring signal input to close a path from said source to said telephone line and to a ring trip portion of said circuit, a first transistor conductive to latch said relay in its operated condition, current detecting means responsive to rectified alternating current ring signals for maintaining the charge on a capacitor above a threshold level, means responsive to direct current through said line resulting from a closed loop condition of said line for causing the direct current and superimposed rectified ringing current to discharge said capacitor below said level, an operational amplifier responsive to discharge of said capacitor below said threshold for changing to a tripped condition to release said latching transistor and cause release of said relay, said relay on release opening the ringing path to said current detecting means, a second transistor for latching said amplifier in said changed condition, and said current detector responsive to the cessation of ring current over said opened path to restore said amplifier from its tripped condition.

* * * * *

UNITED STATES PATENT OFFICE
CERTIFICATE OF CORRECTION

Patent No. 3,941,939　　　　　　　　　　Dated March 2, 1976

Inventor(s) Phillip L. Holmes et al.

It is certified that error appears in the above-identified patent and that said Letters Patent are hereby corrected as shown below:

Column 5, line 17, "direct" should be deleted.

Signed and Sealed this

Twenty-first Day of September 1976

[SEAL]

Attest:

RUTH C. MASON
*Attesting Officer*

C. MARSHALL DANN
*Commissioner of Patents and Trademarks*